United States Patent [19]

Raschbichler et al.

[11] Patent Number: 4,860,430
[45] Date of Patent: Aug. 29, 1989

[54] COMPLETING A LINEAR MOTOR STATOR

[75] Inventors: Hans G. Raschbichler; Luitpold Miller; Manfred Wcislo, all of Ottobrunn; Otto Breitenbach, Nuremberg, all of Fed. Rep. of Germany

[73] Assignees: Kabelmetal Electro GmbH, Hanover; Thyssen Industrie AG, Essen, both of Fed. Rep. of Germany

[21] Appl. No.: 268,232

[22] Filed: Nov. 7, 1988

[30] Foreign Application Priority Data

Nov. 6, 1987 [DE] Fed. Rep. of Germany ....... 3737719

[51] Int. Cl.$^4$ ........................................... H02K 15/085
[52] U.S. Cl. ....................................... 29/596; 29/606; 29/732; 29/824
[58] Field of Search ................. 29/596, 598, 606, 605, 29/732, 736, 824; 310/42, 12, 13, 27

[56] References Cited

U.S. PATENT DOCUMENTS 4,557,038 12/1985 Wcislo et al. .......................... 29/596

Primary Examiner—Carl E. Hall
Attorney, Agent, or Firm—Ralf H. Siegemund

[57] ABSTRACT

A method of making a multiphase winding package and placing it into the grooves of a linear stator being mounted, with open grooves facing down, on the underside of a support and carrier plate, includes storing and paying individual ones of a plurality of separate cables on a vehicle while moving the vehicle on the carrier; the cables are bent individually commensurate with a desired meander configuration for each of them in a winding package; the meander shaped cables are then superimposed corresponding to the winding pattern to be attained; ribbon connection as well as holding elements are provided at fixed distances onto runglike portions of the cables, the thus, in situ assembled winding package is mounted to the stator by placing these runglike portions with holders into the grooves of the stator.

6 Claims, 4 Drawing Sheets

4,860,430

COMPLETING A LINEAR MOTOR STATOR

BACKGROUND OF THE INVENTION

The present invention relates to the placement of three phase ac windings of a coil package into the grooves of an elongated inductor pertaining to and being the stator of a linear motor. This stator is mounted to the underside of a rail plate and carrier so that its grooves face down; the rail plate may pertain to an elongated T-shaped carrier or the like, the rail being the cross bar of the T. It is moreover assumed that the winding that comes as a package is complete at the point of insertion and includes three physically interconnected but electrically insulated flexible cables.

Devices, structure and method of this kind of procedure is disclosed in U.S. Pat. No. 4,557,038 (see also Canadian patent 1,224,912) corresponding to German application 33 23 969 of some of us and others. This known method proposes to bringing a three cable winding package to the installation site by means of vehicle which e.g. runs on that T-shaped carrier. The vehicle may be provided at least with one outriggerlike boom which carries a movable tool arranged to reach down and below the inductor for forcing the windings of the cable package into the grooves and putting them into proper position. The invention improves on this approach.

Linear motors for electrical drives of various kinds are well known in the art. Linear motors include à stator as well as an armature which, contrary to conventional motors, are not arranged on a closed loop but run basically linear straight with of course the possibility of slight curvatures. The electrical energy supplied to this motor is converted into mechanical energy to be immediately and directly available for translatory movement. It is no longer necessary to convert the rotary movement into a linear one whereby certain losses obtain.

Linear motors are usually constructed to have energizing coils arranged in grooves of a stator and the coil or winding system may be arranged to be supplied by a three phase power supply system. The armature element is either constructed as a rail, made of an electrically conductive material such as copper or Al in which case one establishes the equivalence of asynchronous motor. Alternatively, the armature is made of permanent magnetic material which then provides a synchronous motor. Further linear motors are known where a coil is provided in the movable part.

Linear motors are used for example as people movers, for transporting and conveying goods of any kind, for driving movable belts, for baggage transportation, also in mining as feeders for cranes, in drag devices; slides of machine tools are also often operated as and by linear motors; certain mechanical gate structures can be moved by linear motors of this type. Depending on the area of use the motors are relatively short or long, whatever the requirements of movement and displacement.

The coils, as stated, are placed in the stator grooves in a conventional manner which aside from the procedure as per the above reference is a labor intensive procedure. Obviously the longer the stator the more intensive is the labor involved in manufacturing and providing the entire stator assembly including the placement of the windings and loops into the grooves.

The reference mentioned above provides a method and equipment by means of which a prefabricated and premanufactured 3-phase winding package is automatically placed into the grooves of the stator or inductor of a linear motor. The winding package is coiled on a spool which is mounted on a vehicle and as stated a particular tool that extends from the vehicle takes the package off that spool and gradually pushes the package step by step into the grooves of the inductor or stator package.

For this procedure to work it is assumed of course that the stator body is suitably positioned along the path of the vehicle. It is further assumed that the entire range will be covered ultimately by a drive vehicle under utilization of this kind of linear motor. It can readily be seen that this kind of method and the equipment proposed for carrying out the method can place winding packages into the grooves of a stator assembly of any length. Of course the spool holding the package has a limited capacity and has to be replaced by a fresh one every so often. The capacity is often fairly small as compared with the total length to be accommodated so that, relatively speaking, the spool has to be changed rather frequently.

It has to be considered further that one cannot just end with one spool and begin with a new one. Rather respective two packages of windings from the different spools have to be interconnected through suitable sleeves or the like which of course is a job to be undertaken right at the site and constitutes an interruption of the installation procedure as far as placing the loops and windings are concerned. Running the dispensing machine of the type above is comparatively simple on account of the automation. On the other hand making the through connections and placing the sleeves and so forth is a labor intensive procedure requiring highly skilled workmen. There is a certain labor intensity involved which should be replaced through other, more automated procedure.

DESCRIPTION OF THE INVENTION

It is an object of the present invention to improve the known methods of placing 3-phased windings into stator grooves for a linear motor using as point of departure the procedure as set forth in the above mentioned patent 4,557,038 or some others.

It is a specific object of the present invention to provide a new and improved method and procedure for placing 3-phase winding package into the grooves of an elongated stator for linear motor which stator is provided with grooves and is mounted facing down from an elongated carrier which is used to accommodate a vehicle by means of which and through appropriate tools the windings are placed step by step into the grooves.

It is a feature of the present invention to assemble a winding package from individual cables just prior to placement into the grooves of the stator of a linear motor.

In accordance with the preferred embodiment of the present invention the objects and features are attained through combination of the following features. At first individual cables are taken from suitable stores on the vehicle and run through a bending device that is also mounted on the vehicle; next the cable are meander shaped and when in that state the cables are combined with holding structures that are provided at a spacing corresponding to the spacing of the grooves in the stator; these holding devices are brought into position by means of an assembly belt and they are spaced thereon at that spacing which corresponds to the groove spacing of the inductor; the holding devices are subsequently interconnected through mechanically strong ribbons paid from suitable spools also on the vehicles whereby the winding package and its cable are also secured to the holders at the stated predetermined spacing; finally the thus prepared winding package with attached holding devices are passed to the tool which places them progressively into the grooves as the vehicle passes along the carrier rail to which the stator is mounted.

It can thus be seen that the package of windings prior to being placed in the grooves, is prepared in situ by equipment on the vehicle and not before. Hence the vehicle does not store winding packages but just cable in a suitable fashion. The cables are best mounted on spools or drums and can come in that fashion in very long configurations. The 3-phase winding package is assembled on the vehicle and the thus completed package is not stored but on a running basis placed directly in the grooves of the stator. Hence, winding and unwinding of a winding package onto and from a spool of limited capacity is dispensed with entirely.

The package as made in situ for being installed immediately, is much longer than winding packages that were made in the past owing to the very limited capacity in which completed packages could be stored, and that, of course, dispenses with the requirement of frequent interconnection through suitable sleeves or the like. In fact it was found that many an assembly can be completed in that fashion without any connections but at such a length as is usually needed of feeding current to the system. It can readily be seen that a stator winding system cannot be operated uninterruptedly for indefinite length as far as current feeding is concerned, owing to the linear increase of resistance or the length. It becomes plainly impractical and wasteful not to feed current to the system in certain spaced intervals and that length can be matched to the manufactured length so that one has in fact optimized the procedure. Owing to this feature the overall installation becomes more economical and there is the added advantage that the probability of making an assembly error is reduced if there are no or just few connections to be made.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a schematic side view of a section of an inductor mounted on a carrier rail without having any coil winding or the like;

Figure 1:
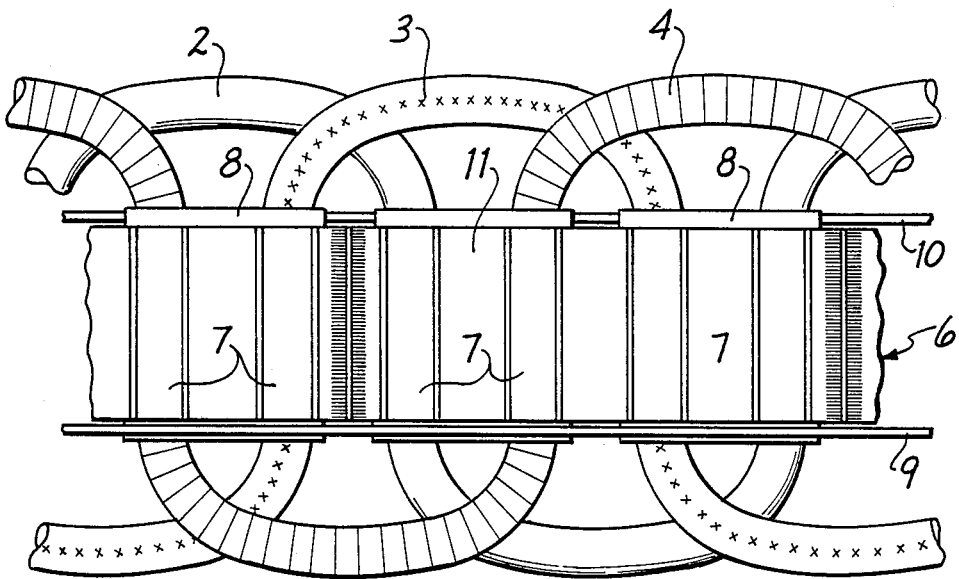
FIG. 1 is basically a view of a completed stator assembly for a linear motor to be made and corresponds in some degree to FIG. 1 of the aforementioned patent.

Proceeding now to the detailed description of the drawings, reference numeral 1 refers to the package of windings which includes three cables 2,3,4. The patterning on them is merely shown for reasons of facilitating the identification. Of course the winding strands and cable may well be provided with suitable markings in order to avoid any mix-up during installation. The cables may be insulated but are provided with electrically conductive jackets.

Figure 2:
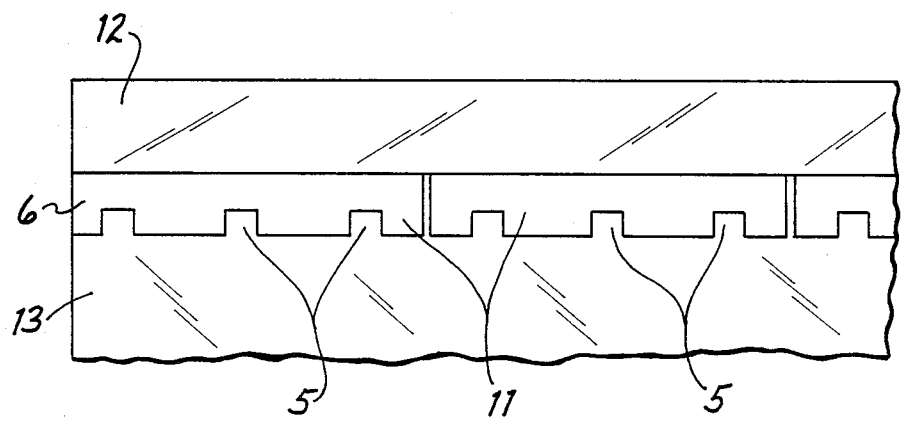

The cables 2,3,4 are assembled in a coherent package establishing the winding package 1 and they are shown in FIG. 1 completed for being placed into the grooves 5 of a stator 6 pertaining to a linear motor (FIG. 2). The package or cable assembly includes ladder rung-like cross portions of the meandering cable on which are placed holders 7 being interconnected in parts by means of loop elements 8. For stator constructions generally see also U.S. Pat. No. 4,310,966 of one of us.

The grooves 5 are in fact closed under utilization of the holding structures 7 such that the windings i.e. the cables 2,3,4 can no longer fall out of the grooves. These structures are affixed to the cable during assembly of the winding package 1 from the cables 2,3,4. Preferably these holding devices 7 are such that through resilient springing or elastic snap action they can be placed into the grooves. See e.g. the snap action of covers 16 in the above mentioned patent 4,310,966.

The structures 7 are constructed as semi-shells or the like having a length corresponding essentially to the width of the stator or inductor 6 and the length of the respective grooves 5 therein. As also shown in FIG. 1 these covers or holding devices 7 may be combined in pairs through loop elements 8. These holding devices 7 are interconnected through mechanically strong tapes or ribbons 9. These ribbons 9 are affixed to the axial ends of the respective holding structure 7.

The ribbons or strips 9 make sure that the package 1 is firmly held together but remains flexible. The ribbons run for the length of the package 1 along both sides thereof and on both ends of the holding devices 7. FIG. 1 shows one of the ribbons 9 schematically as it runs along one of the ends for the holding devices 7. There is an additional ribbon 10 on the other side serving as a grounding ribbon; it likewise extends over the entire length of the package 1 and is in good electrical contact with the conductive jackets of cables 2,3,4.

Figure 3:
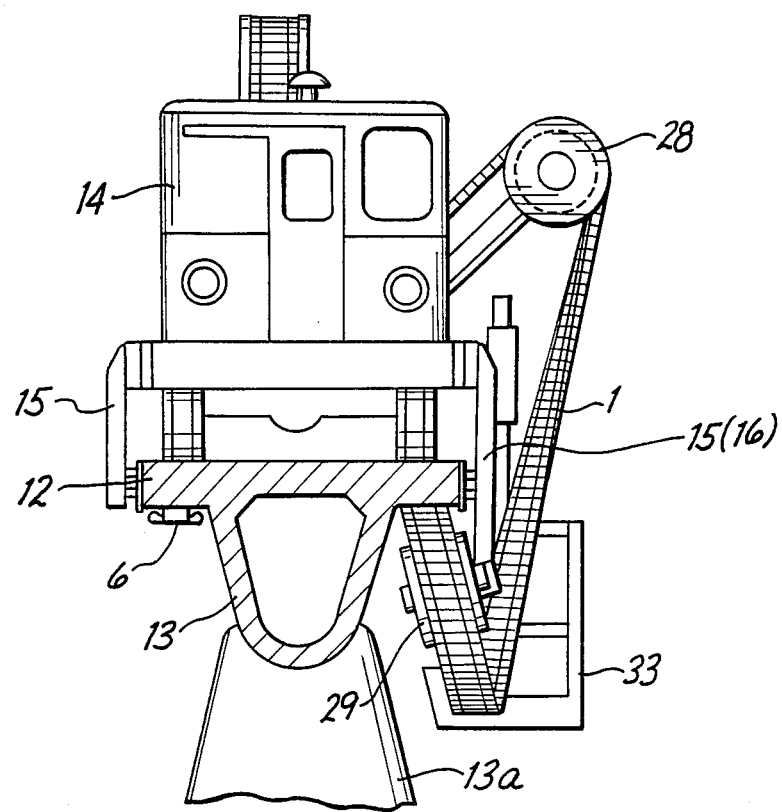
FIG. 3 shows a cross section through the carrier rail shown in FIG. 2 and used in this instance as a platform on which an installation vehicle can run in accordance with the present invention.

The inductor 6 i.e. the stator is comprised of a large plurality of sheet assemblies 11 arranged one behind another in magnetic contiguity. This inductor i.e. the elements of which it is composed is connected to carrier bars or plates 12 being the cross bars of a T-shaped cross section of carrier 13. The carrier 12/13 is made of concrete and is hollow for reasons of weight as shown in FIG. 3. Towers or posts 13a are provided for mounting these carriers 13 along a track.

The stator 6 has its grooves 5 arranged to point down and they are on the underside of the plate 12 which is the cross bar of the T. The upper side of the plate 12 constitutes a kind of platform or track on which e.g. normally runs a magnetically hovering vehicle once the linear motor is installed. For the purposes of installation a vehicle such as 14 may also run on that platform establishing plate 12.

Proceeding to further details of the description of the vehicle 14 and the method it carries out, one can see that the vehicle is provided with guide elements 15 and 16 extending beyond the sides of the plate 12 so as to maintain the vehicle on the track platform. Of course there will be a more accurate way of running the vehicle in that particularly tolerances such as 15a will be observed throughout the length of the carrier 13 and plate 12. The side edges of the carrier plate 12 are actually precisely defined since ultimately a high degree of accuracy is needed for guiding the magnetic vehicle (not 14) in proper position over and along this particular track.

In the present case, for purposes of installation, magnetic hovering is not used; after all the inductor and stator has not yet been completed. The vehicle 14 runs thus on regular wheels and is provided with its own suitable drive engine be it a gasoline engine or any other kind. The vehicle carries three spools 17, 18 and 19 respectively for the three cables 2,3,4 which are therefore individually mounted and made available on that vehicle through the spools. These cables are at this point quite separate from each other and they are provided for being assembled in a winding package, in the course when the vehicle 14 runs along the track 12.

Figure 5:
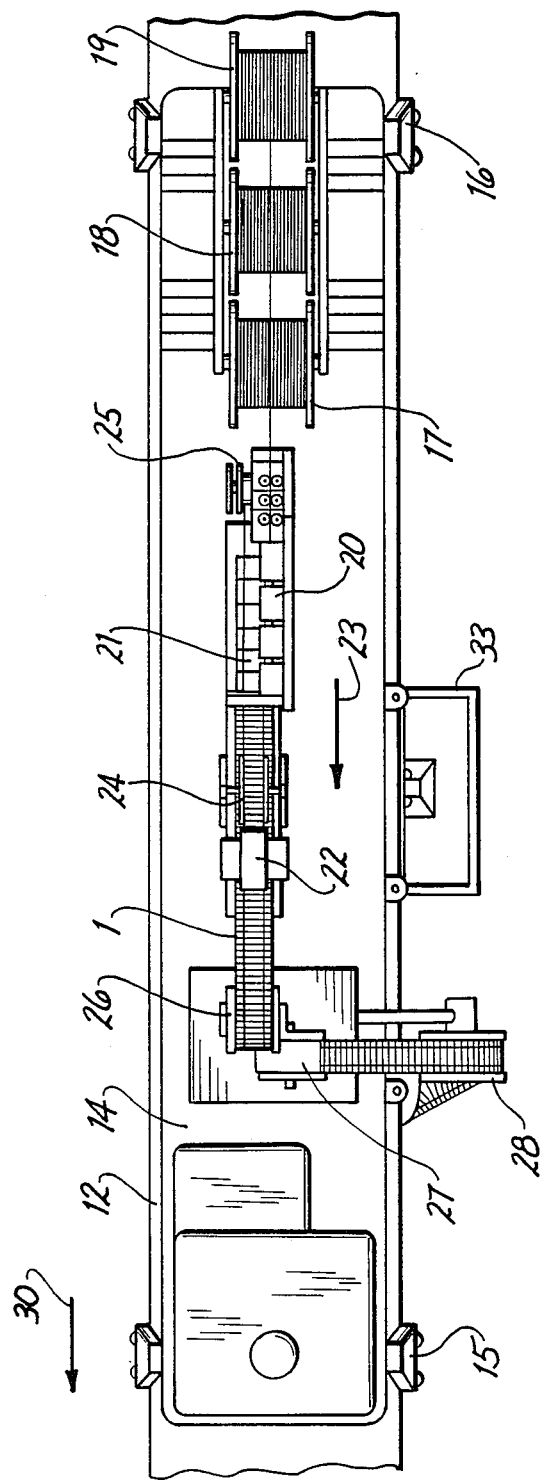
FIG. 5 is a top elevation of the devices and equipment shown in FIGS. 3 and 4.

For purposes of assembly, the cables 2,3,4 are taken off the spools 17,18,19 respectively and are fed to a cable bending structure 20 which still keeps these cables separate and in which they are individually bent to obtain a meander shape. The resulting heads may in addition be crimped on the top or bottom in accordance with the position they will later have (see references above). The bent cables 2,3,4 are then fed to an assembly belt 21 shown in greater details in FIG. 5. This belt has the individual holding elements 7 as shown. The cables 2,3,4 as they arrive in the juxtaposed and stacked position have there transverse portions sequentially pressed into the holders 7 by means of a press tool 22 and while the belt 21 moves itself and the holding devices 7 in the direction of arrow 23. The assembly tool 22 also affixes the ribbons 9 to the holding devices 7. These ribbons are paid from spools 14. In addition a spool 25 is provided to pay out the grounding ribbon 10 which likewise is affixed by means of the tool 22 onto the winding package 1, to contact on a repetitive basis all of the individual cables; since their outer jacket is electrically conductive the electrical ground potential is equalized throughout the assembly.

The arrangement of the cables 2,3,4 on the spools 17,18 and 19 respectively is the preferred form of practicing the invention. Basically there is no essential requirement that in fact these individual cables are on spools. Other kind of storage can be provided such as coil barrel or the like as long they are capable of storing the requisite length for each of the individual cables and as long as they permit easy withdrawal therefrom.

The assembly belt 21 is preferably constructed as an endless belt running through two deflection pulleys. In the alternative it may be a chain element also in an endless configuration. If the endless belt is constructed as a chain then the individual holder 7 can be placed thereon in a fixed distance as given by the chain construction and its elements. The holders 7 may either be placed on the belt by hand or automatically as shown in that they are taken from a storage facility and placed one by one onto the assembly belt 21. If that belt runs at a constant speed then the regular rate of dispensing elements establishes the predetermined distance and spacing which then matches the distance on the grooves of the linear motor. Suitable feedback control may be provided here to ensure consistent accuracy without any accumulation of positional errors.

Figure 4:
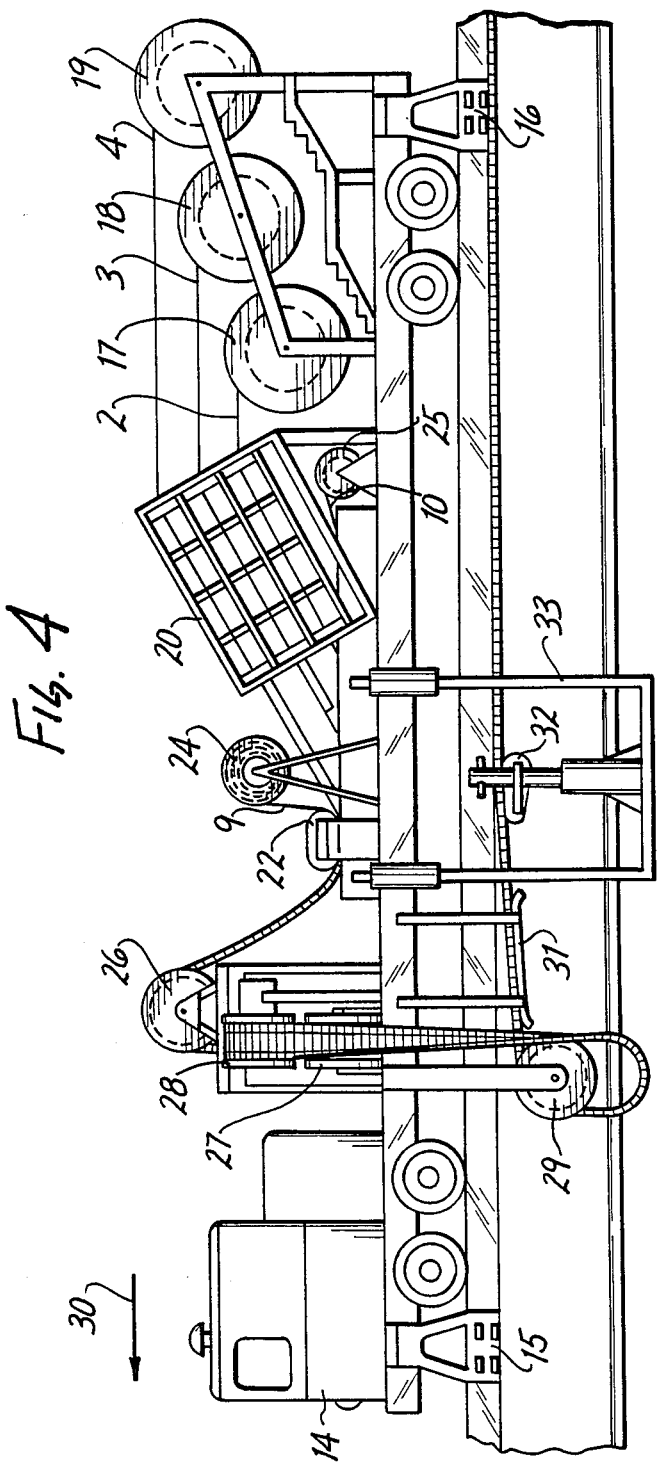
FIG. 4 is a side view of the arrangement shown in FIG. 3.

In order to place the package 1 downstream from the tool 22 into the grooves 5 in the inductor 6 a deflection system is provided to run the assembly down to below the cover 12 of carrier 13. This system is comprised of several rollers. Rollers 26,27,28 and 29 can be seen in FIG. 4. The assembly or package 1 is first taken up by deflection roller 26, twisted by 90 degrees and run down via pulleys 28 and 27 to hang in a free loop while being twisted again and being taken up by pulley 29.

The placement device generally operates upon moving of the vehicle in the direction of arrow 30 and the last roller 29 runs the winding package 1 across the support 31 to the placement tool 32. This tool 32 automatically forces the winding package i.e. the windings of the ladder into the grooves 5 of the inductor 6. It is that portion in each instance that is being forced in the grooves which carries the respective holder 7. The tool 32 therefore forces the respective cable portion into the grooves and presses the holders 7 resiliently into suitable undercut portions of the grooves 5. Hence the placement of the winding portions in the grooves 5 is simultaneously carried out with the affixing the position of the winding packages as a whole in the individual grooves 5 through affixing the holder 7 by snap action to the grooves and closing them. In order to compensate any differences in speed the package 1 may have a compensating loop in between the rollers 28,29.

The support 31 and the tool 32 are provided on at least outriggerlike boom 33 which extends from and is connected to the vehicle 14. The outrigger boom 33 is adjustable as to height and elevation so that it can match to the existing spacial conditions. This movability of the outrigger boom 33 is particularly important when the whole assembly passes through switches, stations etc.

In a preferred form outrigger boom 33 may be constructed to serve simultaneously as an assembly platform supporting a person who inspects and monitors the operation on a running basis and monitors particularly the placement of the winding package 1 into the groove 5 of the inductor 6. This person may e.g. reach the platform by means of a ladder from the interior of the vehicle 14.

The inventive method is carried out as follows. As the vehicle 14 runs on the platform track and plate 12 cables 2,3,4 are simultaneously paid by and from the spools 17,18 and 19. They are individually fed into the bending device 20 which holds them above each other and makes them individually into meander pattern. Holding elements 7 are placed onto the running assembly belt 21. As stated the holding devices 7 may come in pairs held together by loops 8. The interdevice spacing of a pair is the same as the spacing from device to device which matches the spacing of the grooves 5. The belt 21 moves the holding devices 7 to the mounting and assembly tool 22. There then arrive also the individual bent cables 2,3,4. The tool 22 now forces the cable one by one and in a cyclically repetitive basis into the holders 7 as they arrive one by one on the belt 21. This obtains together and in conjunction with placement of the grounding ribbon 10 onto and along the cable. In addition the ribbons 9 are attached to the holders 7 to thereby interconnect all of the holders 7 which feature serves as a further completing the step to obtain a coherent winding package 1.

The package 1 is run through the rollers 26–29 to the support 31 and from there into the tool 32 which automatically and continuously places the cable portions of the winding package 1 into the grooves 5 of the inductor 6. It can thus be seen that assembly of package 1 as well as installation of the winding package are carried out on and by the vehicle 14 while that vehicle runs in the direction of arrow 30. The cable dimension such as length is sufficient to provide a winding package for one km length without interruption. This one km is not a magic number but it was found that it is a very convenient length along which to space the feeding of electric current into the windings. For longer distances the pass is repeated, possibly with a new set of cable spools or one uses large ones to begin with.

If a new set of spools are used, the ends of the cable can readily be interconnected on the vehicle through known connection or splicing techniques with little or no interruption of the entire procedure.

The invention is not limited to the embodiments described above but all changes and modifications thereof, not constituting departures from the spirit and scope of the invention, are intended to be included.

We claim:

1. Method of providing a multiphase winding into the grooves of a stator of a linear motor, the stator being mounted, with open grooves facing down, on the underside of a support and carrier plate being carried in an elevated position, comprising the steps of:
   providing a plurality of individual separate cables on a vehicle and moving the vehicle on said carrier;
   withdrawing the cables individually as the vehicle moves along the carrier and bending the cables individually commensurate with a desired meandering configuration for each of the cables as becoming thereby a part of a winding package to be placed into said grooves;
   providing on said vehicle a plurality of holders which holders are being paid in steps and being spaced from each other commensurate with the spacing of the grooves;
   placing the meander shaped cables in superimposed staggered relationship corresponding to the winding pattern to be attained and providing ribbon connection as well as placing the holding elements at a fixed distance onto portions of the cables which extend transversely to the extension and direction of extension of the stator as a whole to thereby complete a winding package; and
   placing said portions with attached holding elements into said grooves, in sequence and pursuant to the propagation of the vehicle on the carrier.

2. Method as in claim 1 and including attaching a grounding strip in contact with all of said cables along the extension and on each of said transverse portions.

3. Method as in claim 1 providing for a loop portion of said winding package.

4. Method as in claim 1 including providing for a running of assembled cables from the vehicle above the carrier to a position below said carrier and providing further for pushing the transverse portion up into the grooves.

5. Method of providing a multiphase winding into the grooves of a stator of a linear motor, the stator being mounted, with open grooves facing down, on the underside of a support and carrier plate being carried in an elevated position, comprising the steps of:
   providing on a vehicle a plurality of separate cables as well as plural fastening elements;
   running said vehicle on said carrier plate while paying said cables;
   assembling on the vehicle, in situ and on a step by step basis from the cables, a three phase winding package with ladderlike rungs;
   providing the windings of the package with holders; and
   mounting the winding package to the stator by placing the rungs with holders into the grooves as the vehicle runs along the carrier plate.

6. Method as in claim 5 including providing for a running of assembled cables from the vehicle above the carrier to a position below said carrier and providing further for pushing the rung portion up into the grooves.

* * * * *